United States Patent [19]

Lichte

[11] 4,045,646
[45] Aug. 30, 1977

[54] POSITIONING FIXTURE FOR ROCK BIT WELDING

[75] Inventor: Carl Laurent Lichte, Dallas, Tex.

[73] Assignee: Dresser Industries, Inc., Dallas, Tex.

[21] Appl. No.: 581,997

[22] Filed: May 29, 1975

Related U.S. Application Data

[63] Continuation of Ser. No. 409,209, Oct. 24, 1973, abandoned.

[51] Int. Cl.² .......................................... B23K 15/00
[52] U.S. Cl. ..................... 219/121 EB; 219/121 EM; 76/108 A; 228/182; 269/63; 175/375; 175/411
[58] Field of Search ................. 219/121 EM, 121 EB; 269/63, 71; 279/1.5, 5, 110, 112; 76/108 R, 108 A; 278/182, 196, 212; 175/375, 411, 374

[56] References Cited

U.S. PATENT DOCUMENTS

| | | | |
|---|---|---|---|
| 2,225,273 | 12/1940 | Jacobs | 279/112 X |
| 2,831,661 | 4/1958 | Brown | 175/340 |
| 2,901,223 | 8/1959 | Scott | 175/340 X |
| 2,925,659 | 2/1960 | Lovely | 33/168 R |
| 3,148,873 | 9/1964 | Chandler | 269/71 |
| 3,440,392 | 4/1969 | Erlandson et al. | 219/121 EB X |
| 3,535,487 | 10/1970 | Hinrichs et al. | 219/121 EB |
| 3,592,995 | 7/1971 | Hinrichs | 219/121 EB |
| 3,610,873 | 10/1971 | Vansteenkiste | 219/121 EB |
| 3,742,365 | 6/1973 | Sciaky | 219/121 EB |
| 3,850,256 | 11/1974 | McQueen | 175/375 |

Primary Examiner—J. V. Truhe
Assistant Examiner—Mark H. Paschall
Attorney, Agent, or Firm—Eddie E. Scott

[57] ABSTRACT

A positioning fixture is provided for clamping individual segments of a rock bit together in position for an assembled bit with an accurate gage diameter and aligning the seams between the segments with a beam of energy from a welding gun. Relative movement between the segments and the beam causes the beam to traverse the seam in the plane of the seam and fuse the segments together. The segments are indexed by the fixture to sequentially bring the additional seams into alignment with the beam. Relative movement between the segments and the beam causes the beam to traverse the seams in the plane of the seams and fuse the segments together.

4 Claims, 5 Drawing Figures

POSITIONING FIXTURE FOR ROCK BIT WELDING

CROSS REFERENCE TO RELATED APPLICATIONS

This is a continuation of U.S. application Ser. No. 409,209, filed Oct. 24, 1973 for POSITIONING FIXTURE FOR ROCK BIT WELDING, now abandoned. Applicant in this application is also the applicant in the following applications:

U.S. application Ser. No. 574,228, filed May 5, 1975 for POSITIONING FIXTURE FOR ROCK BIT WELDING, said application being a continuation-in-part of U.S. application Ser. No. 409,209, filed Oct. 24, 1973, now abandoned;

U.S. application Ser. No. 564,014, filed Apr. 1, 1975 for UNITIZED ROTARY ROCK BIT, said application being a division of U.S. application Ser. No. 409,207, filed Oct. 24, 1973, now abandoned;

U.S. application Ser. No. 577,828, filed May 15, 1975, now U.S. Pat. No. 3,987,859, for UNITIZED ROTARY ROCK BIT, said application being a continuation of U.S. application Ser. No. 409,207, filed Oct. 24, 1973, now abandoned; and U.S. application Ser. No. 409,208, filed Oct. 24, 1973, now U.S. Pat. No. 3,907,191 for a METHOD OF CONSTRUCTING A ROTARY ROCK BIT.

BACKGROUND OF THE INVENTION

The present invention relates to the earth boring art and more particularly to a welding system for welding a multiplicity of individual segments together to form a rock bit.

A rotary rock bit in general consists of a main bit body adapted to be connected to a rotary drill string. Cutter means connected to the main bit body contact the formation during the drilling operation to form the desired borehole. The present invention provides a positioning fixture for clamping individual segments of the bit body together in the proper position for the final assembled bit and aligning the seams between segments with a beam of energy from a welding gun. Relative movement between the segments and the beam causes the beam to traverse the seams in the plane of the seams and fuse the segments together.

The rotary rock bit must operate under extremely harsh environmental conditions and must effectively disintegrate very hard formations to produce the desired borehole. The gage size of the bits must be precise. Variation in the gage size of bits has been a problem in the prior art. In some operations the bit must pass through casing with a minimum clearance. In other operations it is necessary for the bit to pass through bored and still open holes which may be within a few thousandths of an inch of the gage size of the bit. If the gage size of the bits varies during the manufacturing process, the bits will encounter problems during the drilling operation.

The prior art methods of manufacturing rotary rock bits require the use of shims to size the bits to the proper gage size. The present invention allows the bits to be manufactured with an accurate and uniform gage size without the use of shims. During the construction of a prior art rotary rock bit a substantial amount of heat was generated when the separate segments of the bit were welded together. It was necessary to cool the bits to prevent tempering of steel components and heat damage to rubber components. The excessive heat could result in a change in temper of the metal of the rock bit, thereby creating the danger of a premature failure of the metal during the drilling operation. Since the rock bit often includes rubber or synthetic parts, any excessive heating in the vicinity of said parts could cause a weakening or destruction of said parts. It was necessary to use dowels between the segments of prior art bits to insure proper alignment.

The prior art method of manufacturing rotary rock bits consists of forming a weld groove between adjacent segments of the bit and filling the weld groove with a weld deposit by a welding process. Surfaces on adjoining segments are in adjacent relationship but the surfaces are not joined together and the joining of the segments is through the weld deposit. The cross sectional shape of the prior art weld was an irregular many sided polygon. An excessive amount of weld deposit was produced during the welding of prior art bits and the excessive amount of weld deposit would often result in warpage of the bit body. The excessive weld deposit also created the danger of the lubrication system and the bearing systems being contaminated during the manufacturing process by debris from the welding process. The weld deposit is not as hard as the body segments, thereby creating fatigue problems.

When the individual segments of the bit body are to be joined together, they must be accurately positioned during the welding process. If the individual segments are not properly positioned, the gage size of the bit will not be accurate. When a beam of energy is used to join the individual segments of the bit, the individual segments must be accurately aligned with the beam during the welding process. The joining of the individual segments of the bit body together in accordance with the present invention insures that the gage size of the bit will be accurate.

An illustration of the problems created with prior art manufacturing processes will be presented with reference to a rotary cone rock bit. A rotary cone rock bit includes at least one rotatable cutter mounted on a bearing pin extending from the main bit body. Bearings are provided between the cutter and the bearing pin to promote rotation of the cutter and means are provided on the outer surface of the cutter for disintegrating the formations as the bit and cutter rotate and move through the formation. A sufficient supply of lubricant must be provided to the bearings throughout the lifetime of the bit. The lubricant is maintained within the bearing area by a flexible rubber seal between the cutter and the bearing pin. Any excessive heating of the bit will damage the rubber seal and/or the lubricant. If the bit body is not constructed to a precise gage size, the bits will encounter difficulties when they are moved through casing having a minimum clearance or through a borehole with a minimum clearance. Excessive weld deposits may result in warpage of the bit and a resulting inaccurate gage size.

Description of Prior Art

In U.S. Pat. No. 2,807,444 to W. H. Reifschneider, patented Sept. 24, 1957, a rotary earth boring drill is shown and claimed in which the bit head is formed of a plurality of arcuate segments each of said segments being asymmetric and comprising a body portion having a downwardly extending leg and a downwardly extending hollow boss in side-by-side relation thereon, there being a passage communicating between the interior of the bit head and the bores of the bosses.

In U.S. Pat. No. 2,831,661 to G. R. Brown, patented Apr. 22, 1958, a drill bit consisting of three segmental elements which are adapted to fit together to constitute a bit is shown. After forging, the segmental elements are machined to afford accurately meeting surfaces when the elements are assembled together. The margins which represent the meeting of the segments are given a chamfer for providing a weld groove. The three segmental elements are assembled in a jig and welding is carried out along the groove.

In U.S. Pat. No. 2,778,926 to W. H. Schneider, patented Jan. 22, 1957, a method for welding and soldering by bombarding by electrons the engaging surfaces of two parts to be connected is shown. The method disclosed shows a system for soldering, welding, or sintering suitable materials by heating the parts to be connected with a beam of electrons.

SUMMARY OF THE INVENTION

The present invention provides a positioning fixture for clamping individual segments of a rock bit together in the proper position for the final assembled bit and aligning the seams between segments with a beam of energy from a welding gun. The gage cutting surfaces are held in the proper position for an accurate gage diameter bit. Relative movement between the segments and the beam causes the beam to traverse the seams in the plane of the seams and fuse the segments together. The fixture includes adjustable means for clamping the segments together, means for gaging the bit diameter, means for placing the segments in a position with the beam aligned with a first seam and means for moving the segments to a position with a second seam aligned with the beam. The above and other features and advantages of the present invention will become apparent from a consideration of the following detailed description of the invention when taken in conjunction with the accompanying drawings.

DETAILED DESCRIPTION OF THE INVENTION

Figure 1:
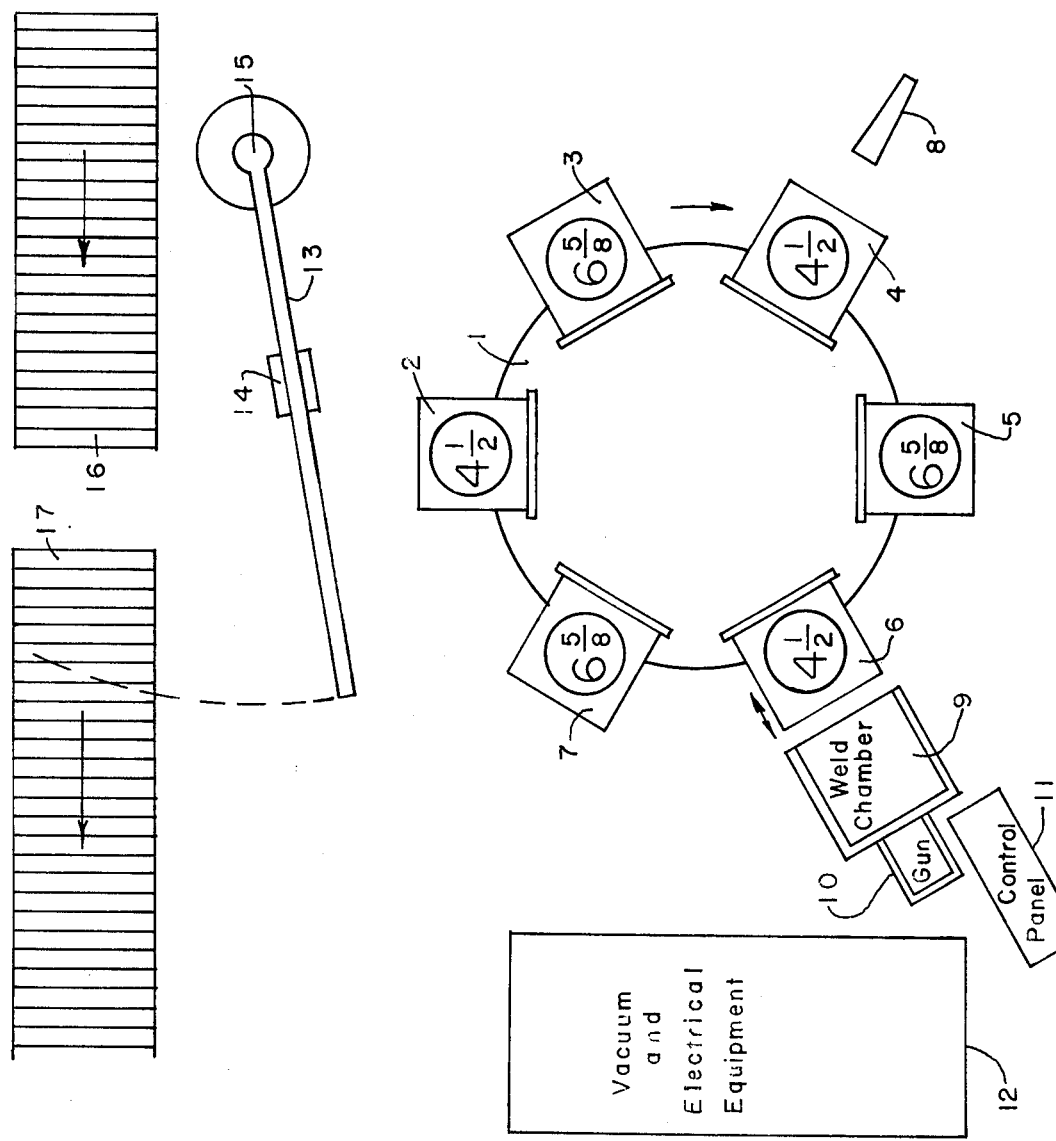
FIG. 1 is a schematic illustration of a welding system constructed in accordance with the present invention.

Referring now to FIG. 1, a schematic illustration of a welding system incorporating the present invention is shown. A dial feed type rotatable table 1 contains six positioning fixtures. The table 1 rotates the fixtures through three individual operating stations. The six positioning fixtures are divided into two sets of three fixtures each and each set of three fixtures is adapted to be sequentially rotated through the three operating stations. Fixtures 2, 4, and 6 at alternate locations may be adapted to receive bits with 4½ inches API regular pin connections and fixtures 3, 5, and 7 at alternate locations may contain bits with 6⅝ inches API regular pin connections. The dial feed 1 will normally index 120° to move a particular fixture through the three operating stations. The individual segments that are to be positioned together to make up a rock bit are brought in on conveyor 16. The segments are moved from the conveyor 16 to the assembly station. Fixture 2 is shown at the assembly station in FIG. 1. A hoist 14 may be used to lift the segments to the assembly station. The hoist 14 travels along arm 13 and arm 13 is adapted to pivot about rotatable element 15.

The segments are loaded in the fixture and positioned at the desired gage diameter with the seams in alignment for welding. For example, the segments for one bit will be assembled on fixture 2 in the proper positions for the final assembled bit. The dial feed 1 will be rotated 120° to bring the fixture 2 to the verification station. Fixture 4 is shown at the verification station in FIG. 1. A jig transit 8 is used to insure that the segments are properly positioned for the welding operation. The dial feed 1 is again rotated 120° to bring the fixture to the welding station. Fixture 6 is shown at the welding station in FIG. 1. The fixture is moved into the weld chamber 9. When the fixture is moved into the weld chamber 9, the weld chamber is completely closed and sealed. The weld chamber 9 is then evacuated for the welding process. The welding gun 10 is an electron beam gun that produces a beam of high intensity electrons. The beam has a high intensity (10 KW/mm$^2$) and a high power capacity (60 KW). The operation may be controlled from a control panel 11. The vacuum and electrical equipment are located in panel 12. After the welding has been completed, the chamber vented and the fixture moved back to the dial feed the dial feed 1 is indexed 120° bringing the final assembled bit back to the assembly station. The assembled bit is removed from the station and placed on conveyor 17 to be prepared for shipment. The hoist 14 may be used when unloading the assembled bit.

Figure 2:
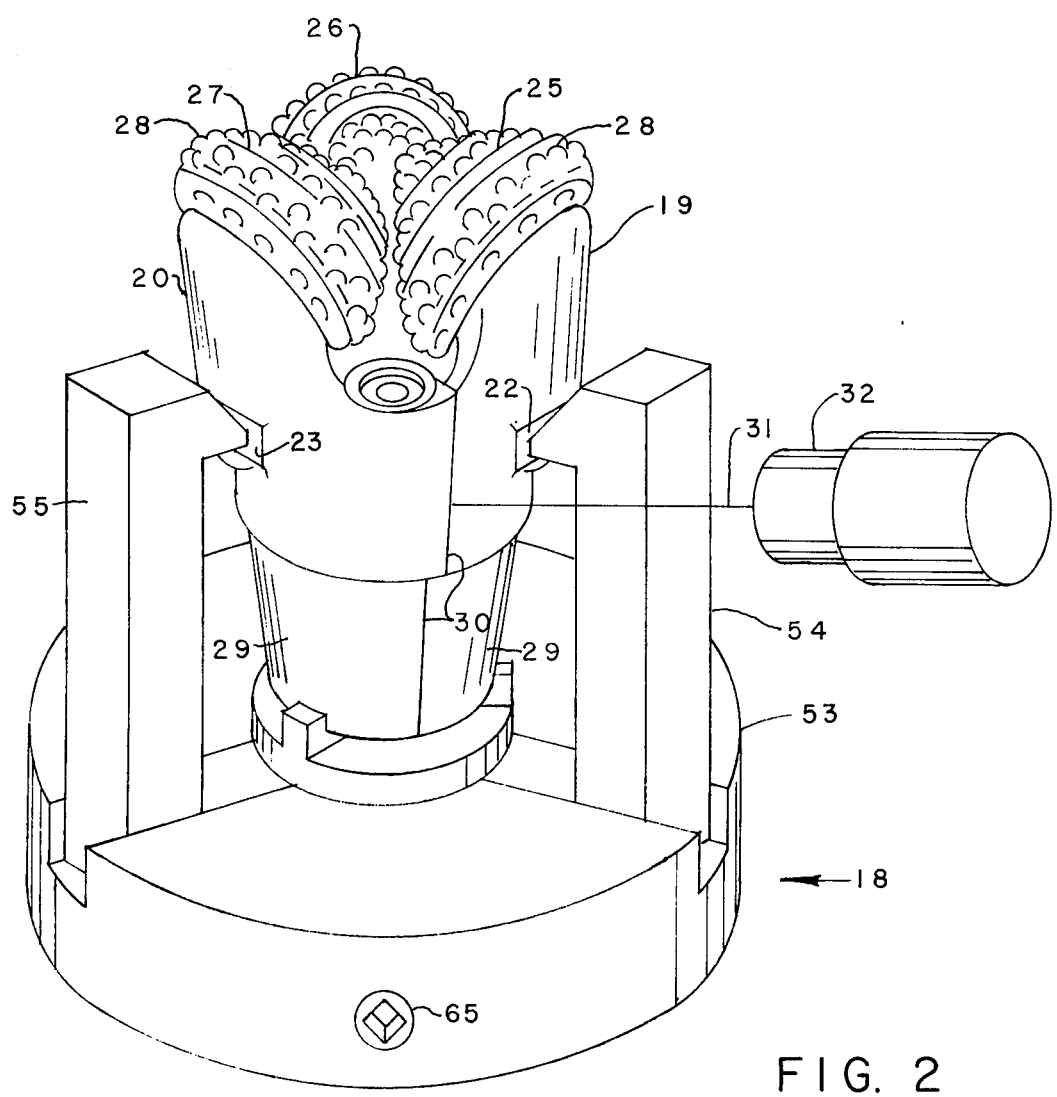
FIG. 2 shows three individual segments of a rotary rock bit positioned together for welding.

Referring now to FIG. 2, the upper portion of a positioning fixture constructed in accordance with the present invention is shown with three separate segments of a rotary rock bit positioned in the fixture. The fixture 18 will be located on the dial feed 1. The three segments 19, 20 and 21 (segment 21 being located behind segments 19 and 20 in FIG. 2) are positioned together and aligned in the proper position for the final bit. Chuck jaws 54, 55 and 56 (chuck jaw 56 being located behind segments 19 and 20 in FIG. 2) clamp the segments 19, 20 and 21 in the proper position for the final bit. Rotation of screw 65 will cause the chuck jaws 54, 55 and 56 to adjust the position of the segments. The chuck jaws 54, 55 and 56 and screw 65 are part of a clamp unit 53. The clamp unit 53 is a three jaw scroll chuck. For example, the clamp unit 53 may be a 15 inch steel body scroll chuck, size 15, part No. 36315 shown on page 65 of catalog No. 64 and manufactured by Union Chuck Division, Union Manufacturing Co., New Britain, Conn.

The segments 19, 20 and 21 include rotatable cone cutters 25, 26 and 27 that contain a multiplicity of tungsten carbide inserts 28 adapted to contact and disintegrate formations and form a borehole. The pin ends 29 of the segments are positioned on keys on the clamp unit 53. The abutting faces that form the seams are in sliding relationship to one another. The chuck jaws 54, 55 and 56 contact flats 22, 23 and 24 on the segments 19, 20 and 21, respectively, to force the segments 19, 20 and 21 together. The faces slide relative to one another to bring the gage inserts on the cutters into contact with a ring gage. The final bit will therefore have an accurate gage size.

An electron beam 31 from the electron beam gun 32 will traverse the seam 30 between segments 19 and 20 in the plane of the seam 30 to weld segments 19 and 20 together. The fixture 18 will rotate to index the next seam between segments 20 and 21 into alignment with the electron beam 31. The electron beam 31 is then caused to traverse the seam between the segments 20 and 21 to fuse segments 20 and 21 together. The positioning fixture is rotated 120° to index the next seam between the segments 19 and 21 into alignment with the electron beam 31. Relative movement between the segments and the electron beam 31 will cause the electron beam to traverse the seam in the plane of the seam to weld segments 19 and 21 together. Because of the high intensity of the electron beam (10 KW/mm$^2$) and its high power capacity (60 KW) the width of the area acted on between the segments is much narrower than that found in prior art rock bits. In addition, the electron beam gun produces a beam that penetrates substantially through the area to be joined. The energy from the electron beam is applied rapidly, thereby preventing heat buildup and reducing the danger of damaging the portions of the rock bit that have a low tolerance to heat such as the rubber seal and the lubricant. The segments 19, 20 and 21 of the rock bit fit together to form a square-butt type joint rather than the V-groove or the J-groove joints that were required in prior art rotary rock bits. The electron beam does not add material to produce a buildup of deposit along the seams and there is very little if any warpage.

Figure 3:
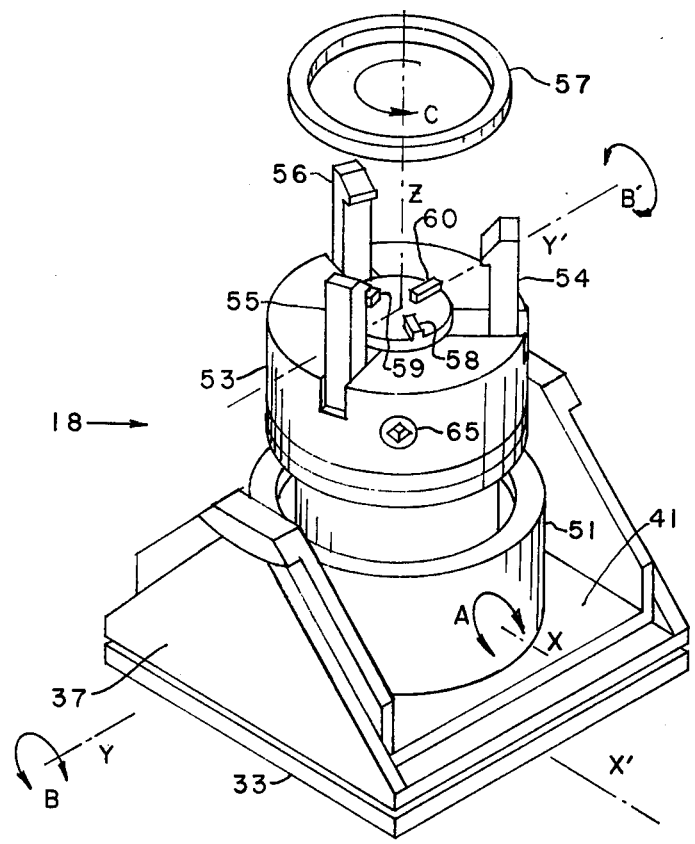
FIG. 3 shows a positioning fixture constructed in accordance with the present invention.

Referring now to FIG. 3, the positioning fixture 18 is shown. The fixture base 33 is mounted on the dial feed 1. The fixture base 33 is adapted to move radially on dial feed 1 along the Y axis into the weld chamber 9. Once the positioning fixture 18 is in the weld chamber the clamped segments 19, 20 and 21 are sequentially indexed into positions wherein the seams between segments are in alignment with the beam from the electron beam gun to weld the segments together. A swing support 37 is mounted on the fixture base 33. The swing support 37 is moveable along the X' axis to move the plane of the seam coincident with the plane of the beam. A swing 41 is mounted on the swing support 37. The swing 41 provides rotational adjustment B'. The rotational adjustment B' in combination with rotation of the clamped segments provides alignment of the plane of the seam coincident with the plane of the beam. A gimbal beneath cover 51 provides X, Y, A, and B adjustment to correctly position the center line of symmetry of the fixture 18 for the 120° C for rotation indexing. Clamp unit 53 places the segments in the proper position for welding the segments into the final assembled bit. The keys 58, 59, and 60 maintain the segments in the correct height relationship for the final assembled bit and orient the seams between the segments in the proper position for alignment with the beam. The chuck jaws 54, 55 and 56 contact the segments. A ring gage 57 is positioned around the cones of the segments contacting the gage surfaces of the cones to insure that the final assembled bit will have the proper gage size.

Figure 4:
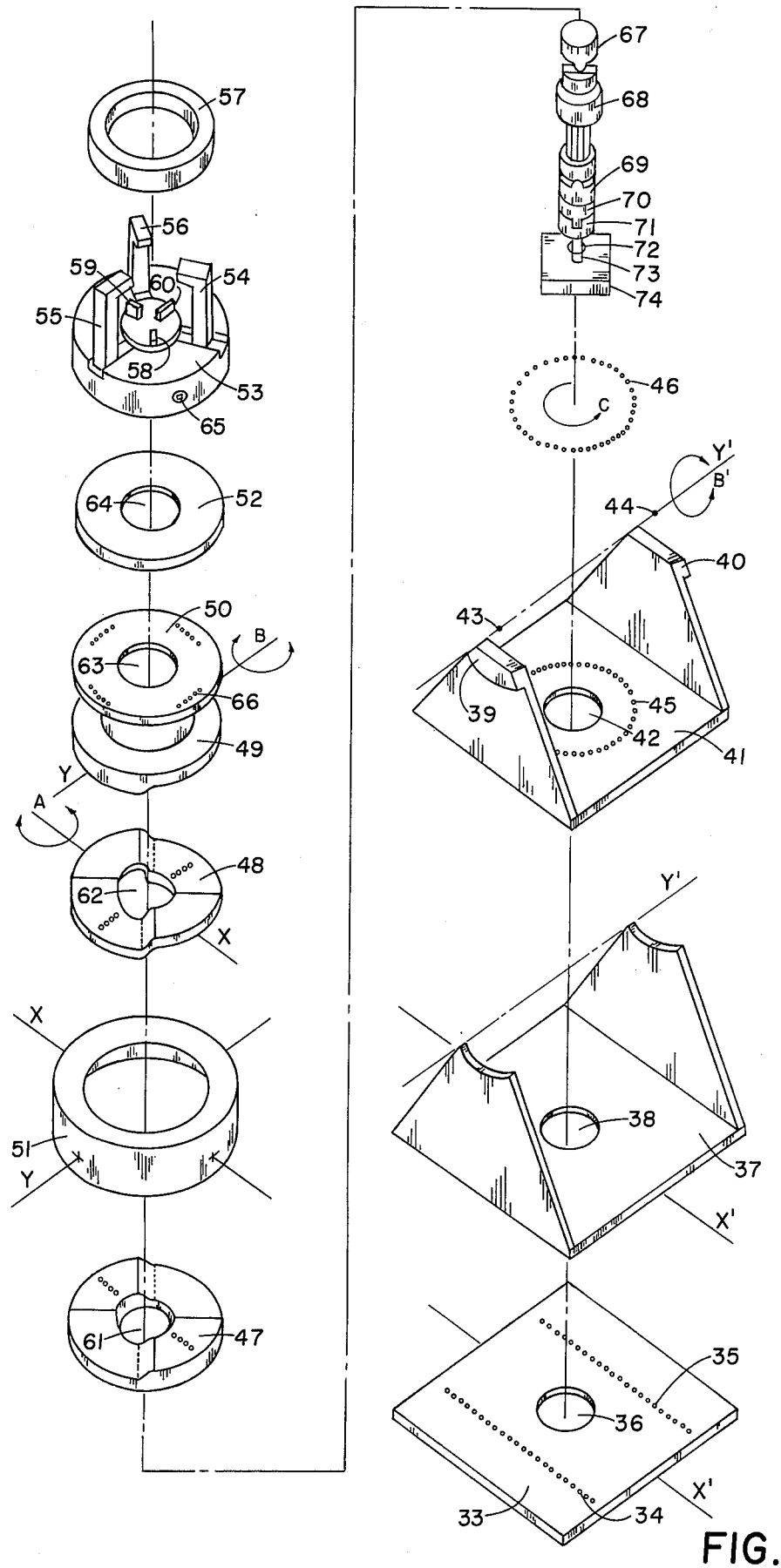
FIG. 4 is an exploded view of the positioning fixture shown in FIG. 3.

Referring now to FIG. 4, an exploded view of the positioning fixture 18 is shown to illustrate the movement and function of the various parts. Bearings 34 and 35 are provided on the fixture base to allow the swing support 37 to move along the X' axis relative to the fixture base 33. A hole 36 in the fixture base 33 allows the indexing drive element for the C rotation indexing to extend through the fixture base 33. The swing 41 is mounted in the swing support 37. The swing 41 rotates about points 43 and 44 providing B' rotation. Protruding curved hinge elements 39 and 40 fit within concave recesses on swing support 37. The radius of the curves of hinge elements 39 and 40 is just sufficient to insure that swing 41 will rotate about points 43 and 44.

A hole 42 in the swing 41 receives the indexing drive element for the C rotation of indexing. Bearings 45 and 46 allow the upper portion of the fixture 18 to rotate relative to the swing 41 to accomplish the C rotation indexing. The lower gimbal base 47 is connected to the indexing drive. A hole 61 extends through lower gimbal base 47. A middle gimbal 48 provides adjustment along the X axis and rotation adjustment A. A hole 62 extends through the middle gimbal 48. The top gimbal 49 provides adjustment along the Y axis and rotation adjustment B. A cover 51 is attached to the gimbal base 47 and positioned over middle gimbal 48 and top gimbal 49. A spacer 50 includes bearings 66 to allow the stage 52 a slight amount of $C_1$ rotation for alignment adjustments. The spacer 50 includes a hole 63 and stage 52 has a central opening 64. The clamp unit 53 is mounted on the stage 52. The clamp unit 53 includes movable jaws 54, 55 and 56 that move radially on clamp unit 53. Rotation of screw 65 moves the jaws 54, 55 and 56 inward to contact the segments of the bit. Keys 58, 59 and 60 insure that the segments will be properly positioned in the clamp unit 53. The ring gage 57 is positioned over the segments and contacts the gage surface on the cones.

Figure 5:
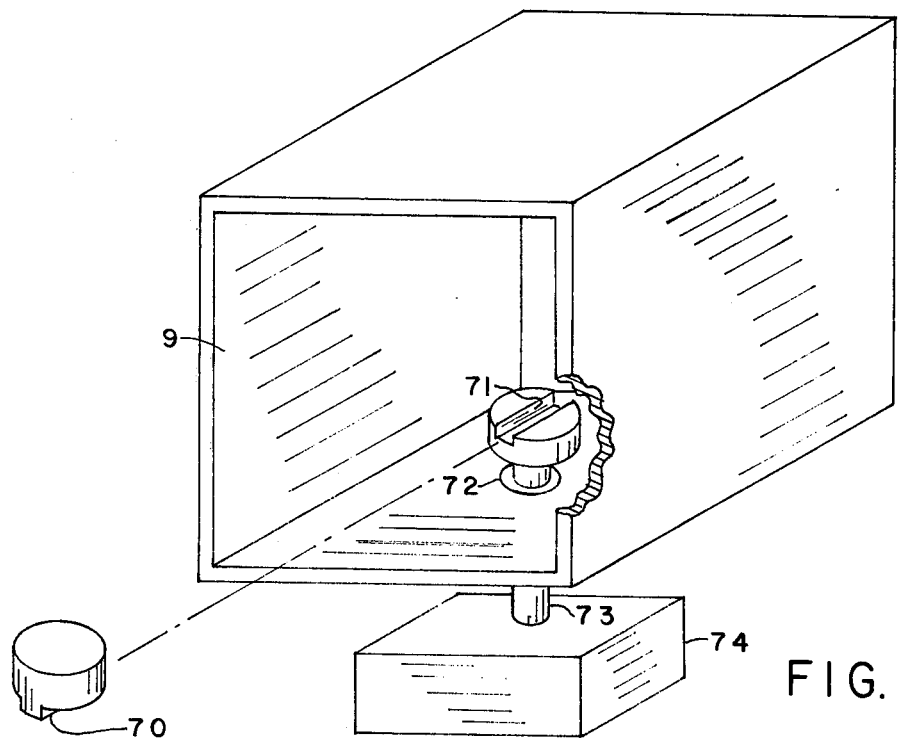
FIG. 5 shows the welding chamber of the welding system shown in FIG. 1.

The indexing drive is shown and illustrated in FIGS. 4 and 5. A universal joint 67 is attached to the lower gimbal base 47. A spline connection 68 extends between universal joint 67 and a universal joint 69. The universal joint 69 is connected to a key element 70. The key element 70 fits within a keyway element 71. The keyway element 71 is attached to a shaft 73. A seal 72 surrounds shaft 73. Shaft 73 is connected to a 120° indexing drive unit 74. The indexing drive unit 74 is conventional; for example, it may be an indexing drive manufactured by Commercial Cam and Machine Co., 400 North Ashland Ave., Chicago, Ill. 60622 or by Ferguson Machine Co., 11820 Lackland Road, St. Louis, Mo. 63141. As shown in FIG. 5, the shaft 73 extends through the floor of welding chamber 9 and seal 72 provides an air tight seal around shaft 73. The keyway element 71 is positioned above the floor of the weld chamber 9 and receives the key element 70 when the positioning fixture is moved into the weld chamber 9.

The structural details of a positioning fixture for welding rotary rock bits having been described, the welding operation will now be considered. Three individual segments are removed from the conveyor 16 and mounted in the positioning fixture 18 at the assembly station. A groove in the pin end 29 of the segments is positioned over the keys 58, 59 and 60. The chuck jaws 54, 55, and 56 contact flats 22, 23 and 24 machined on the segments 19, 20 and 21. The screw 65 is rotated forcing the segments 19, 20 and 21 together and into the proper position for the final assembled bit. The ring gage 57 is positioned over the cone cutters 25, 26 and 27 and the cone cutters 25, 26 and 27 are moved into contact with the ring gage to insure that the final assembled bit will have the proper gage size. Shims are not used to size the bit to the proper gage size. Instead of using dowels to position the segments 19, 20 and 21, the segments 19, 20 and 21 are moved relative to one another to bring the bit to the proper gage size. The faces between adjacent segments slide relative to one another to bring the cone cutters 25, 26 and 27 into contact with the ring gage 57. For example, the upper proportions of the segments 19, 20 and 21 are moved slightly outward. The faces between the segments are scissored to bring the upper portion of the segments 19, 20 and 21 outward into contact with the ring gage 57.

The dial feed 1 is rotated to bring the positioning fixture 18 to the verification station. The jig transit 8 is used to insure that the plane of the seam 30 is in the proper position for welding and that upon 120° indexing of the clamping unit 53, the next seams will be brought into the proper position for welding. The dial feed 1 is again rotated 120° to bring the positioning fixture 18 to the weld station. The positioning fixture is moved into weld chamber 9 by the fixture base 33 moving along the Y axis radially outward on the dial feed 1. The chamber 9 is evacuated and the first seam is welded by the beam from the electron beam gun 10 traversing the seam in the plane of the seam. The fixture 18 indexes the clamped segments 120° to bring the next seam into alignment with the beam. After that seam has been welded the clamped segments are indexed 120° to bring the third seam into alignment with the beam. Once the third seam has been welded, the positioning fixture is moved back onto the dial feed 1 and the dial feed 1 is rotated to bring the positioning fixture to the assembly area. The completed bit is removed from the positioning fixture and three new segments may be placed in the positioning fixture to continue the operation.

A further understanding of the welding operation will be obtained by considering the following welding procedure.

WELDING PROCEDURE

1. Place a rock bit set master in the fixture.
2. Bring the axis of symmetry of the rock bit set master into a position coincident with the Z axis of the fixture by adjustment of the gimbal. Adjustment of the gimbal will provide A and B rotation and X and Y axis movement.
3. Remove the rock bit set master from the fixture and insert the three segments of the rock bit.
4. Place the ring gage on the segments and bring the gage surface of the cutters into contact with the ring gage to insure that the segments are in the proper position for an accurate gage size bit.
5. If the segments exactly mate, the planes of the seams between the segments will meet to form a line and the line will be coincident with the Z axis. In this case, the plane of one of the seams between segments will be properly aligned with the beam of the electron beam gun and rotation of the fixture (C rotation) 120° will bring the next plane of the seam between two segments into alignment with the beam of the electron beam gun. Additional rotation (C rotation) 120° will bring the next plane of the seam into line with the beam of the electron beam gun.
6. In actual practice, the segments seldom exactly mate to provide the bit with the desired gage size. The segments therefore have to be adjusted with respect to one another to insure that the gage size of the bit is accurate. The prior art rock bits used shims between the separate segments to bring the cutters to the proper gage size. The segments are adjusted according to the present invention by scissoring the segments with respect to one another thereby bringing the gage of the cutters into the proper position for an accurate gage size bit. The pin end of the segments will remain in their original position and the threading of the pin end will be unhampered by uneven connections between segments. The cones will move relative to one another, thereby bringing the gage surfaces of the cones to the proper gage size. The planes of the seams will not meet to form a line. Instead, the plane of the seams will be askew to the Z axis. The axis of symmetry of the bit, however, will remain coincident with the Z axis.
7. In order to bring the plane of the seams into alignment with the beam of the electron beam gun, the swing is rotated to bring the exposed edge of the seam parallel to the plane of the beam. The fixture is rotated ($C_1$ rotation) about the vertical axis (Z axis) to bring the plane of the seam parallel to the plane of the beam. The fixture is then moved laterally (along the X axis) to bring the plane of the seam coincident with the plane of the beam. Once this has been accomplished, indexing of the fixture (C rotation) 120° will bring the plane of the seam between the next two adjacent segments into alignment with the beam of the electron beam gun. Additional rotation of the fixture (C rotation) 120° will bring the last plane of the seam between two segments of the bit into line with the beam of the electron beam gun.

The embodiments of the invention in which an exclusive property or privilege is claimed are defined as follows:

1. Apparatus for constructing a rotary rock bit by welding separate segments of the bit together with a beam of electrons along the seams between segments, said segments being positioned together in a composite with said seams being out of alignment with the central axis of the composite placing the gage cutting structure of the rock bit at the desired gage diameter, comprising:

a vacuum chamber;

an electron beam gun for directing a beam of electrons into said vacuum chamber, said electron beam gun being connected to said vacuum chamber so that it will direct said electron beam into said vacuum chamber along a beam plane in a fixed position within said vacuum chamber;

means for urging said segments together into said composite with said gage cutting structure at the desired gage diameter and the seams out of alignment with the central axis of the composite;

tilting means for tilting the composite of said segments about a first axis that will be parallel to said beam plane when said segments are in said vacuum chamber, rotating means for rotating said composite of said segments about the central axis of the composite, said tilting means and said rotating means adapted to place a seam in a position where it would be parallel to said beam plane when said segments are in said vacuum chamber;

means for moving said composite of said segments laterally along a second axis that is perpendicular to said beam plane to place a seam in alignment with said beam plane when said segments are in said vacuum chamber;

means for moving said composite of said three segments into said vacuum chamber along said first axis thereby aligning a seam with said beam plane; and indexing means for indexing said segments through angular increments to sequentially bring additional seam planes into alignment with said beam plane.

2. An apparatus for constructing a rotary rock bit from three individual segments by aligning each seam between adjacent segments with a beam of electrons, said beam of electrons establishing a beam plane and said seams between adjacent segments establishing seam planes, said rock bit having a central axis and gage cutting surfaces with said seam planes being out of alignment with said central axis and said gage cutting surfaces being at the proper gage diameter, comprising:

a vacuum chamber;

an electron beam gun for directing a beam of electrons into said vacuum chamber, said electron beam gun being connected to said vacuum chamber so that it will direct said electron beam into said vacuum chamber along a beam plane in a fixed position within said vacuum chamber;

chuck means for holding said three segments together in a composite with said seam planes being out of alignment with said rock bit central axis and said gage cutting structure being at the proper gage diameter;

tilting means for tilting the composite of said three segments about an axis that will be parallel to said beam plane when said segments are in said vacuum chamber;

rotating means for rotating said composite of said three segments about said rock bit central axis, said tilting means and said rotating means adapted to place one of said seams in a position where its seam plane would be parallel to said beam plane when said segments are in said vacuum chamber; and means for moving said composite of said segments laterally along an axis that is perpendicular to said beam plane to place said seam plane in alignment with said beam plane when said segments are in said vacuum chamber;

means for moving said composite of said rock bit segments into said vacuum chamber along said first axis thereby aligning said seam plane with said beam plane; and indexing means for indexing said segments through 120° angular increments to sequentially bring additional seam planes into alignment with said beam plane.

3. Apparatus for constructing a rotary rock bit from three individual segments by aligning first, second and third seams between adjacent segments with a beam of electrons wherein said beam of electrons establishes a beam plane and wherein said first, second and third seams between adjacent segments establishes first, second and third seam planes, said apparatus aligning the beam plane and said first, second and third seam planes, said rock bit having a central axis and gage cutting surfaces with said first, second and third seam planes being out of alignment with said central axis and said gage cutting surfaces being at the proper gage diameter, comprising:

a vacuum chamber;

an electron beam gun for directing a beam of electrons into said vacuum chamber, said electron beam gun being connected to said vacuum chamber so that it will direct said electron beam into said vacuum chamber along a beam plane in a fixed position within said vacuum chamber;

chuck means for holding said three segments together with said first, second and third seam planes being out of alignment with said central axis and said gage cutting structure being at the proper gage diameter;

tilting means for tilting said three segments about a Y axis that will be parallel to said beam plane when said segments are in said vacuum chamber;

rotating means for rotating said three segments, said tilting means and said rotating means adapted to place said first seam plane in a position where it would be parallel to said beam plane when said segments are in said vacuum chamber; and means for moving said three segments laterally along an X axis that is perpendicular to said Y axis to place said first seam plane in alignment with said beam plane when said segments are in said vacuum chamber;

means for moving said three segments into said vacuum chamber along said Y axis thereby aligning said first seam plane with said beam plane; and indexing means for indexing said segments through 120° angular increments to sequentially bring said second and third seam planes into alignment with said beam plane.

4. Apparatus for constructing a rotary rock bit having a proper gage diameter from three individual segments by aligning first, second and third seams between adjacent segments with a beam of electrons wherein said beam of electrons establishes a beam plane and wherein said first, second and third seams between adjacent segments establishes first, second and third seam planes, said apparatus aligning the beam plane and said first, second and third seam planes, said rock bit having a central axis with said first, second and third seam planes being out of alignment with said central axis and each of said segments having a cutter with said cutter having a gage cutting structure, comprising:

a vacuum chamber;

an electron beam gun for directing a beam of electrons into said vacuum chamber, said electron beam gun being connected to said vacuum chamber so that it will direct said electron beam into said vacuum chamber along a beam plane in a fixed position within said vacuum chamber;

chuck means for holding said three segments together placing said gage cutting structures of said cutters at the proper gage diameter with said first, second and third seam planes being out of alignment with said central axis;

tilting means for tilting said three segments about a Y axis that will be parallel to said beam plane when said segments are in said vacuum chamber;

rotating means for rotating said three segments, said tilting means and said rotating means adapted to place said first seam plane in a position where it would be parallel to said beam plane when said segments are in said vacuum chamber;

means for moving said three segments laterally along an X axis that is perpendicular to said beam plane to place said first seam plane in alignment with said beam plane when said segments are in said vacuum chamber;

means for moving said three segments into said vacuum chamber along said Y axis thereby aligning said first seam plane with said beam plane; and indexing means for indexing said segments through 120° angular increments to sequentially bring said second and third seam planes into alignment with said beam plane.

* * * * *